April 27, 1943.  C. J. FRANCOIS  2,317,598
EXPANSION JOINT
Filed Feb. 26, 1941  2 Sheets-Sheet 1
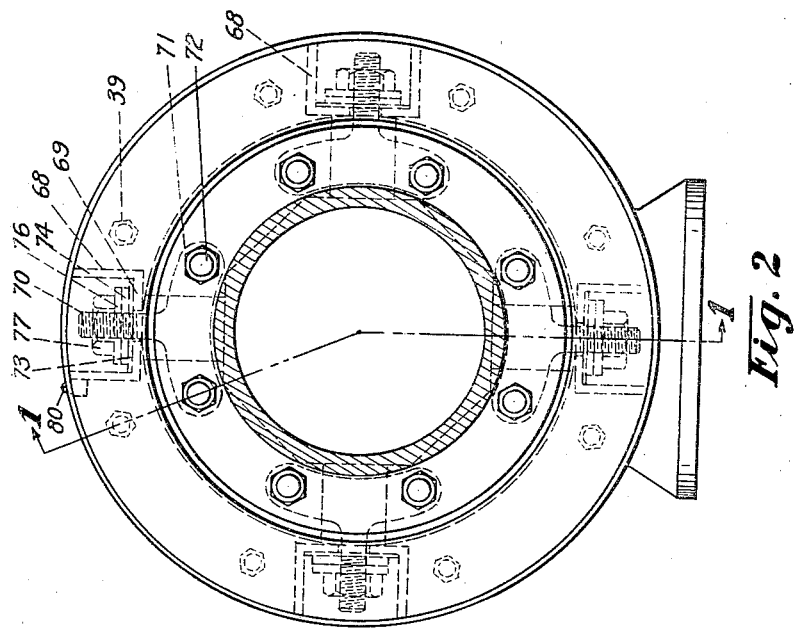
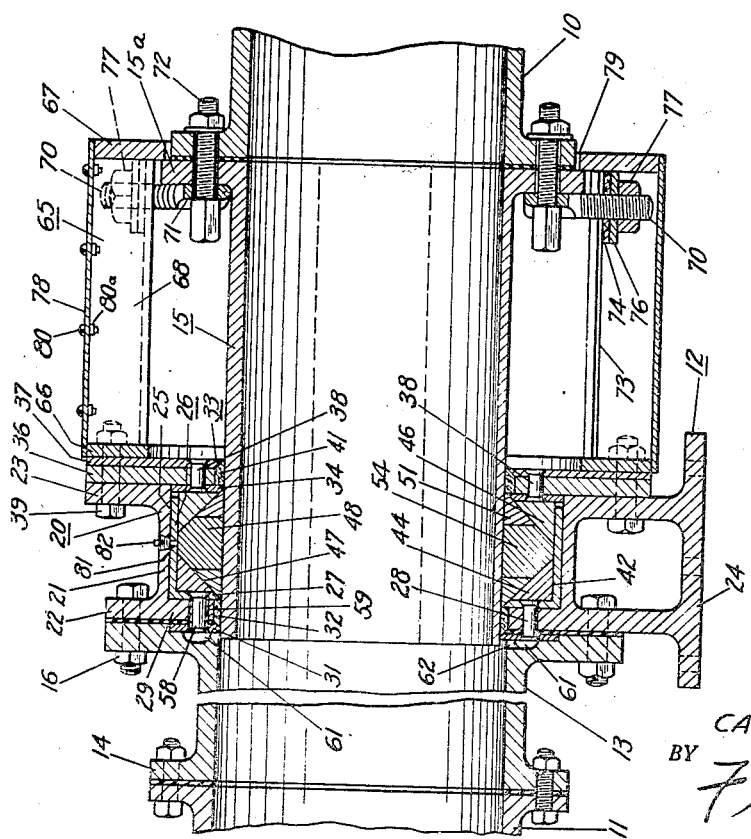
INVENTOR.
CARL J. FRANCOIS
BY
Flournoy Corey.
ATTORNEY.

April 27, 1943.                C. J. FRANCOIS                 2,317,598
                                EXPANSION JOINT
                             Filed Feb. 26, 1941              2 Sheets-Sheet 2
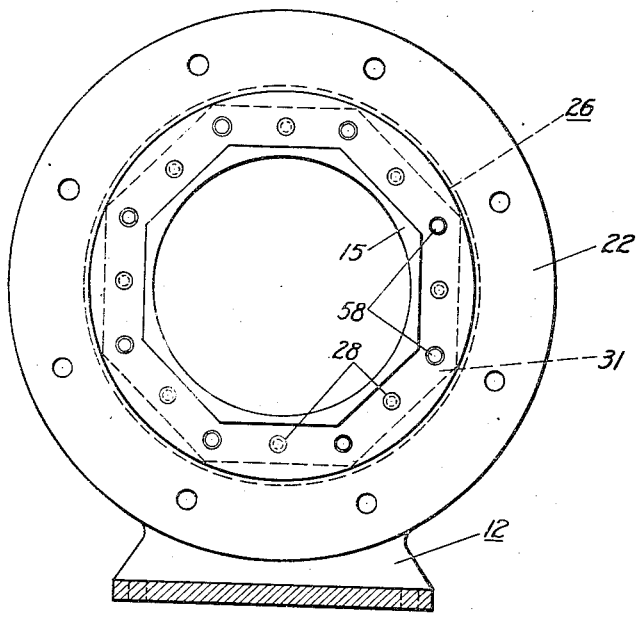
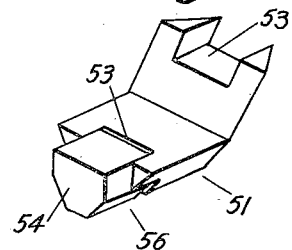
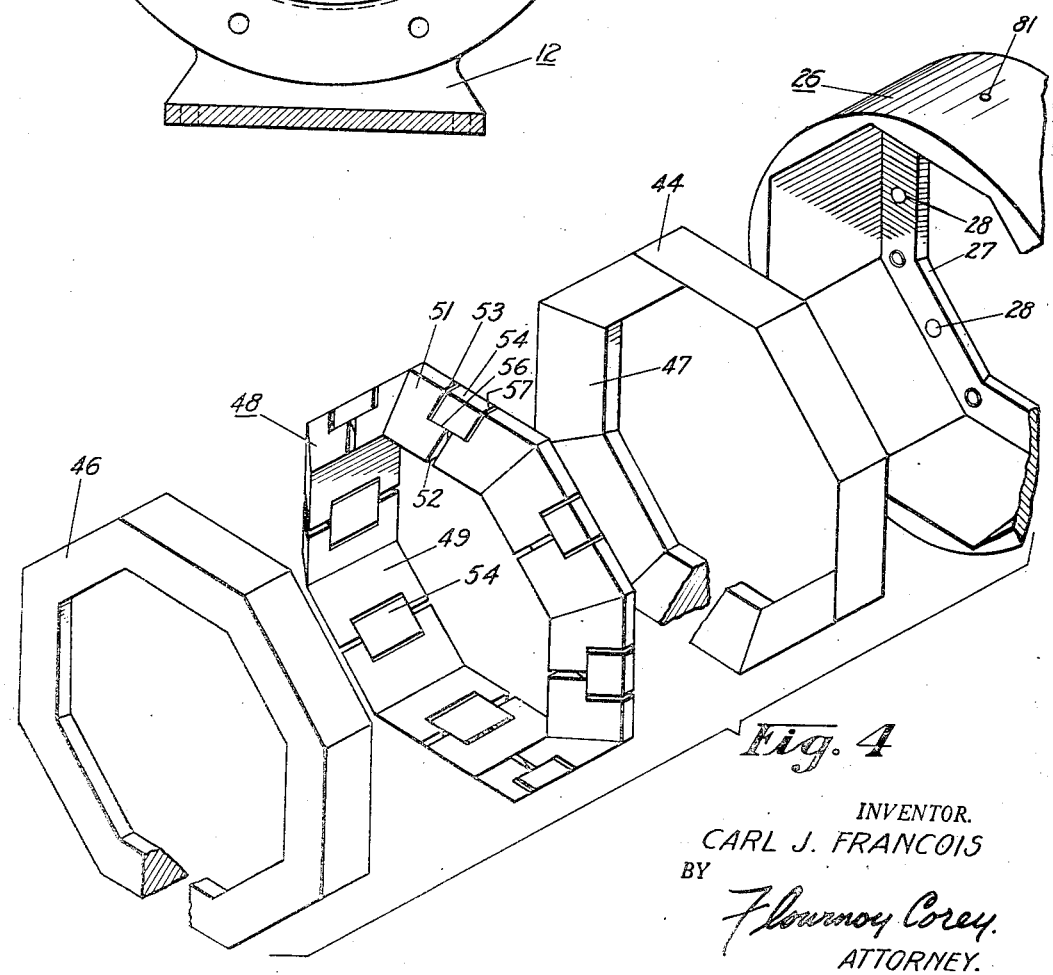
INVENTOR.
CARL J. FRANCOIS
BY
Flournoy Corey.
ATTORNEY.

Patented Apr. 27, 1943

2,317,598

UNITED STATES PATENT OFFICE 2,317,598

EXPANSION JOINT

Carl J. Francois, Cedar Rapids, Iowa

Application February 26, 1941, Serial No. 380,627

8 Claims. (Cl. 285—162)

This invention relates to expansion joints and has particular relation to a self-adjusting and self-maintaining packing gland for such devices.

In the construction and laying of pipe lines, and particularly those designed to carry liquid or vapors of relatively high temperatures, it is necessary to provide sliding joints at spaced intervals along the pipe line to take care of lineal expansion.

In devices of this nature, as heretofore constructed, it has been the practice to provide a sealing gland requiring periodical adjustment and lubrication as well as other service, and it has been necessary, particularly in connection with such lines as buried steam lines, to provide manholes adjacent each expansion joint. Obviously the necessity for these manholes greatly increases the first cost of such a pipe line, and further limits the location of such pipe lines to places where it is possible and practical to place such manholes.

Obviously, also, the cost of maintenance of expansion joints requiring periodical servicing will, over a period of years, add up to a very considerable figure.

It is, therefore, among the objects of my invention to provide an expansion joint in which means are provided not only for easy installation and initial adjustment, but such a joint as will be self-maintaining and self-lubricating for extremely long periods thereafter.

It is a further object of my invention to provide a self-adjusting packing or sealing gland adapted to be taken up automatically by pressure of the fluid within the conduit.

It is a further object of my invention to provide a packing gland of a nature adapted to employ a rigid type of self-lubricating, packing material.

A further object of the invention is the provision of improved means for supporting and adjusting the parts of the joint relative to each other during installation, and for removing the weight of the ends of the pipe sections from the packing or sealing material throughout the period of its life, whereby the use of the packing gland is restricted to sealing the joint against leakage.

A still further object of my invention is to provide simplified safety stops, in an expansion joint, for limiting the longitudinal movement of the end of the pipe in either direction.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a sectional view taken on the line 1—1 of Figure 2 through an expansion joint constructed in accordance with a preferred embodiment of my invention.

Figure 2 is a view in end elevation of the joint shown in Figure 1.

Figure 3 is a view in end elevation of the joint shown in Figure 1 with the barrel 13 removed.

Figure 4 is a view in perspective illustrating, in exploded relation, the parts of the sealing gland as constructed in accordance with a preferred embodiment of my invention, and Figure 5 is a fragmentary view in perspective of one of the segments of the sealing gland ring.

Referring now to the drawings and to Figure 1 thereof in particular, I have illustrated generally at 10 and 11 the ends of adjacent sections of a pipe line joined together by an expansion joint indicated generally at 12.

The expansion joint comprises, in general, a barrel 13, provided with a flange 14 at one end for bolted engagement with the end of one pipe line section, a pipe sleeve 15 slidable within the barrel 13, a packing gland 20 bolted, by means of the flange 22, to the adjacent flanged end 16 of the barrel 13, and a supporting and guiding element, illustrated generally at 65.

The sleeve 15 is preferably provided with a plurality of plane surfaces rather than a cylindrical outer surface. I have therefore illustrated the sleeve as having eight plane surfaces about its periphery, but it is obvious than any other desired number of sides may be employed. The packing gland 20 preferably comprises a substantially cylindrical packing box 21 flanged at the ends, as indicated at 22 and 23, and having a mounting foot 24, and provided with an annular recess 25 on its inner side for receiving a sleeve 26 of a rust resisting material such as bronze or the like. This sleeve 26, which is better illustrated in Figure 4, is flanged at one end, as shown at 27. Rivets 28 equally spaced about the flange 27 secure the sleeve 26 within the annular recess of the packing gland box, these same rivets passing through holes in an inwardly flanged portion 29 of the gland box 21 and through the annular member 31.

Packing material 32, which is secured between the inwardly extended ends of the sleeve flange 27 and the annular member 31, is preferably of a graphite impregnated bearing material such as bronze or the like. This packing material provides one support in which pipe 15 is partially guided and supported and in which it may freely slide.

In a similar manner, a second guide bearing is provided at the opposite end of the sealing gland box, as indicated generally at 33. This member includes annular members 34, 36 and 37 riveted together, as shown at 38, and bolted to the flange 23 of the gland box 21 and as shown at 39. The graphite impregnated bearing material 41 is clamped between the extended inner ends of the annular members 34 and 37 in a manner similar to that in which the bearing material 32, before described, is held.

The inner surfaces of the guide bearings 32 and 41, as well as the inner edges of the annular members 27, 31, 34 and 37, are of course octagonal in shape to closely receive the outer surface of the pipe sleeve 15.

A closed recess 42 is now provided between the octagonal pipe sleeve 15 and the inner octagonal surface of the bronze sleeve 26, and in which recess a pair of octagonal adjusting rings 44 and 46 are received. One of these rings 44 is made freely slidable within the bronze sleeve 26. These octagonal rings are spaced apart and their adjacent surfaces beveled or tapered as shown at 47, preferably at an angle of about 45 degrees.

A packing or sealing ring, octagonal in shape and best shown at 48 in Figure 4, is adapted to be closely received between the pipe sleeve 15 and the bronze sleeve 26 and between the tapered octagonal rings 44 and 46. The outer side walls of the sealing ring are tapered in such a manner as to provide a smooth sliding fit within the tapered inner walls of the octagonal adjusting rings 44 and 46.

This packing ring, or at least the inner surface thereof, is preferably made of a graphite impregnated bearing bronze or like material, and the inner surface 49 machined or lapped to closely engage and provide a seal with the outer surface of the pipe sleeve 15.

In order to permit this sealing ring to be forced inwardly by the tapered adjusting rings, the sealing ring 48 is made in the form of eight individual segments, each similar to that shown in Figure 5 and preferably with the joint between adjacent segments midway between the corners of the ring. Sufficient clearance is provided between the ends of adjacent segments of the sealing ring to permit considerable wear on the inner surfaces 49 of the individual segments before the ends of the adjacent segments will meet. The ends of adjacent segments are recessed to provide a generally rectangular and more or less radial slot between the ends of such adjacent segments. A sealing block 54, which may be of the same material as the sealing ring but which is preferably made of a soft graphite material, is formed so as to provide a close fit along the sides 56 of each of these slots in order to provide a seal. Sufficient clearance is provided at the ends of these sealing blocks as shown at 57 to permit the adjacent segments to approach each other as their inner sealing surfaces 49 wear.

It will be obvious now that movement of the one tapered ring 44 toward the tapered ring 46 will wedge or force the individual segments of the sealing ring 48 inwardly into close engagement with the outer surface of the pipe sleeve 15.

The ring 46 is a close sealed fit within the octagonal recess of the bronze sleeve 26, and it will thus be seen that when the tapered ring 44 is moved toward the ring 46, all possible passageways for the leakage of gas or fluids are positively sealed.

In order to provide for self-adjustment and self-maintenance of this sealing gland during use, I have provided a plurality of small piston-like members 58 interposed between the rivets 28 with one end of a piston bearing against the tapered ring 44 adjacent each corner thereof. These pistons are mounted for free sliding movement within graphited bronze bushings 59.

The barrel 13 is provided on its flanged end 16 with an annular recess 61 adjacent the outer ends of the piston members 58, and a conduit 62 connects the bore of the barrel 13 with the annular recess to permit the pressure of any fluid in the conduit to be transferred through the annular recess and to be applied against the outer ends of the piston members 58. Thus the pressure on these pistons exerts a constant longitudinal pressure on the tapered octagonal ring 44 forcing it toward the tapered ring 46 and exerting inward pressure on the segments of the sealing ring 48.

In order to remove the weight of the pipe line and the sliding sleeve 15 from the bearing or sealing portion 32 and 41 and also from the sealing gland 48, I have provided a supporting and guiding structure, as indicated generally at 65. This structure preferably includes a pair of hollow center annular members 66 and 67. These rings are spaced apart and secured together by means of a plurality of pairs of angle members 68, to the ends of which the annular members may be welded. The adjacent inner edges 69 of the angles are spaced apart to provide a slot extending parallel to the axis of the pipe line for receiving support and guide bolts 70 for sliding movement.

These bolts are provided with wing heads 71, the heads of these bolts being secured to the flange 15a of the pipe sleeve 15 by means of the flange clamping bolts 72.

The bearing surfaces of the angle members 68 are plated to make them rust resistant or are covered with a thin sheet of stainless steel or the like, and as indicated at 73. A square piece 74 of graphite impregnated bearing metal, as previously mentioned, is mounted along with a washer 76 beneath the head of each adjusting nut 77.

When an expansion joint such as I have described is assembled into a pipeline, the supporting nuts 77 on the supporting screws 70 are adjusted to remove the weight of the pipe line from the bearing and guiding members 32 and 41, and from the sealing ring 48, so as to eliminate excessive wear of those parts and to prevent binding of the sleeve therein.

The guide members 65 permit smooth, free, sliding action of the pipe sleeve 15 within the sealing and packing gland, and the construction and the materials of construction practically eliminate all possibility of binding due to rust, scale, or lack of lubrication.

A cylindrical hood or shell 78 of brass or other rust resistant material is mounted between the outer surfaces of the annular members 66 and 67 to form a closed, cylindrical cover about the guide structure 65 and about the sliding pipe sleeve 15 so as to completely exclude foreign matter. Small screws 80, tapped into lugs 80a attached to one of the angles 68, secure the ends of the hood member in place. The annular end member 66 of the guide structure may be attached by means of the flange clamping bolts 39 to one flange 23 of the sealing gland box 21 along with the retainer discs 36 and 37.

It is of course desirable that some means be provided for limiting the amount of relative movement between the adjacent ends of the pipe line, and I have accordingly shown the flange clamping bolts 72 as having elongated heads which will come to bear against the annular clamping plate 37 if and when the pipe line expands beyond the maximum safe limit.

I prefer to limit the amount of movement of the joint due to contraction of the pipe line by providing the annular casing end member 67 with an opening 79 through its center somewhat smaller than the outside diameter of the flange 15a of the pipe sleeve 15. The pipe sleeve flange 15a will therefore come to bear against this annular end member of the guide structure before or when the supporting and guiding bolts 70 reach the ends of the guides 68.

I have provided in the sealing gland box 28 an opening 81 extending through the outer wall thereof and through the wall of the bronze sleeve 26 through which a non-hardening and non-gumming lubricant may be forced, when the joint is first assembled into a pipe line, to thoroughly fill all crevices and to thoroughly lubricate all moving parts of the sealing gland. Such a lubricant may be in the nature of a finely divided graphite mixed with lard oil or the like. After the joint has once been lubricated, it may be completely sealed with a pipe plug, as indicated at 82.

I have devised an expansion joint and a packing gland for such a joint which is self-adjusting and self-maintaining during the life of the joint and which is particularly well suited for installation in places where it is difficult to provide service. I have also devised means for providing the sliding member with both internal and external support and guide members whereby wear and possibility of binding of the internal guide and sliding sleeve is reduced to a minimum, and for providing true alignment of the sliding sleeve in the packing gland. A joint such as I have devised makes it possible to eliminate a number of the largest items of expense normally asociated with pipe lines of the usual structure. The elimination of the necessity for periodical lubrication and service makes it possible, in most cases, to entirely eliminate the manholes usually provided at each of such joints. It is obvious that such a joint or such a sealing gland may be employed anywhere a sliding leak-free joint is required.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In an expansion joint for pipes, a sliding member, a receiving member, a sealing means including a plurality of inter-locking parts adapted to engage the sliding member, said parts having a plurality of flattened outer surfaces, and tapered means, engaged with the receiving member, adapted to receive the flattened outer surfaces of the sealing means and to provide a sliding joint between the parts of the sealing means and the sliding member.

2. In an expansion joint, a packing box, a sleeve slideable therein, a segmental packing ring having a plurality of transversely cut sections disposed within the packing box, means providing a seal between the ends of adjacent segments, and means for biasing the segments of the packing ring inwardly against the outer surface of the sleeve.

3. In an expansion joint, a packing box, a sleeve slideable therein, a packing ring comprising a plurality of interfitted transversely cut segments disposed within the packing box, an adjusting ring having a tapered inner wall engageable with the outer surface of the packing ring, and means providing for movement of the adjusting ring longitudinally of the joint whereby the segments of the packing ring may be wedged inwardly to closely engage the surface of the sleeve.

4. In a sliding joint, a packing box, a multi-plane-sided sleeve slideable therein, a segmental sealing ring disposed within the box and encircling the sleeve, said sealing ring having at least one segment for each side of the sleeve, and each segment extending over a corner of the sleeve whereby the joints between adjacent segments each come over a plane side of the sleeve, a sliding joint operatively connecting the ends of adjacent segments, and means for biasing the segments of the sealing ring inwardly into close engagement with the plane-sided surfaces of the sleeve.

5. In an expansion joint for pipes, a packing box, a sleeve receivable within the packing box, a packing ring disposed within the box and about the sleeve, a compression ring tapered on its inner side and disposed for sliding engagement over the outer surface of the sealing ring, means comprising a plurality of pistons operatively connected with the compression ring whereby movement of the pistons will cause sliding movement of the compression ring over the sealing ring to thereby compress the sealing ring, and means for conducting pressure, against the rear of the pistons, of any fluid within the pipe.

6. In a sliding joint, a packing box, a multi-plane-sided sleeve slideable therein, a segmental sealing ring disposed within the box and encircling the sleeve, said sealing ring having at least one rigid segment of graphite impregnated bearing material for each side of the sleeve, and each segment extending over a corner of the sleeve whereby the joints between adjacent segments each come over a plane side of the sleeve, a sliding overlapping joint operatively connecting the ends of adjacent segments, and means for biasing the segments of the sealing ring simultaneously inwardly into close engagement with the plane-sided surfaces of the sleeve.

7. In a sliding joint, a packing box having a polygonal-shaped recess therein, a sleeve having an outer surface of similar polygonal shape received within the packing box recess, a packing ring having similar inner and outer surfaces receivable within the packing box recess and about the sleeve, the said packing ring comprising a plurality of substantially rigid, lubricant impregnated segments, no one segment thereof extending beyond the surfaces of any two adjacent sides of the sleeve, whereby joints at the corners are eliminated, the said packing ring being provided with clearance between the ends of adjacent segments to permit wear on the inner surface of the packing ring, means slideably engaging the ends of adjacent segments to provide a seal therebetween, the said packing ring having at least one peripheral surface thereof tapered relative to the axis of the sliding joint, and a compression ring slideable within the recess of the packing box and having an inner surface thereof tapered to slideably engage with the tapered surface of the packing ring whereby movement of the compression ring over the packing ring will wedge the segments of said packing ring inwardly against the sleeve.

8. In an expansion joint for pipes, a substantially fixed member, a sleeve slideable therein, internal positioning and guiding means within the fixed member, a sealing means adjacent said internal guide means and providing a seal between the inner wall of the fixed member and the outer wall of the sleeve, and external guide means spaced outwardly from the sleeve and extending parallel to the axis of the fixed member, said external guide means including guide rails, runners slideable thereon, adjustable means secured at one end to one end of the sleeve and at the opposite end to the guide runners.

CARL J. FRANCOIS.